United States Patent [19]
Perret et al.

[11] 3,949,425
[45] Apr. 6, 1976

[54] VIDEO SYSTEMS

[75] Inventors: Ludwig A. Perret, La Canada; Thomas C. Soran, West Covina, both of Calif.

[73] Assignee: Bell & Howell Company, Chicago, Ill.

[22] Filed: Apr. 29, 1974

[21] Appl. No.: 465,030

[52] U.S. Cl. ............................. 360/137; 360/85
[51] Int. Cl.² ................ G11B 5/008; G11B 23/04
[58] Field of Search .......... 360/137, 85; 178/6.6 A, 178/6.6 DD

[56] References Cited
UNITED STATES PATENTS

| | | | |
|---|---|---|---|
| 3,283,251 | 11/1966 | Murphy .............................. | 360/137 |
| 3,582,965 | 6/1971 | De Metrick ......................... | 360/137 |
| 3,604,624 | 9/1971 | Miura et al. ......................... | 360/137 |
| 3,641,278 | 2/1972 | Kinjo et al. ...................... | 178/6.6 DD |
| 3,657,488 | 4/1972 | Pountney et al. .................... | 360/137 |
| 3,674,942 | 7/1972 | Sugaya et al. ...................... | 178/6.6 A |

*Primary Examiner*—Stuart N. Hecker
*Attorney, Agent, or Firm*—Benoit Law Corporation

[57] ABSTRACT

Apparatus for transducing information relative to an information carrier having a rest position, and for processing transmitted information, comprises equipment including a transducing device for transducing information relative to the information carrier, a device for totaling and indicating operating hours, equipment for positioning the information carrier in an active position and the transducing device, and means operatively associated with the totaling and indicating device and the positioning equipment for activating the totaling and indicating device only upon the positioning of the information carrier in the active position whereby only operating hours during which the information carrier is in the active position are totaled and indicated.

6 Claims, 6 Drawing Figures

VIDEO SYSTEMS

BACKGROUND OF THE INVENTION

1. Field of the Invention

The subject invention in its various aspects relates to airborne video display systems, apparatus for transducing information relative to an information carrier, airborne systems for reproducing recorded video signals, and apparatus for cooling rotary electromagnetic equipment.

2. Description of the Prior Art

In recent years, many airplanes have been provided with motion picture projecting equipment for entertaining passengers during longer flights. In parallel to this endeavor, attempts have been made to provide passenger entertainment with the aid of electronic video display systems operating with video programs received over the air or reproduced by a video tape recorder or playback machine.

Prior-art attempts in the latter area have been sporadic and unsuccessfull from a long-term point of view. In particular, such attempts manifested a prejudice in the art to the effect that electronic video entertainment systems could not be operated with electric power of the 400 Hz frequency typically found aboard aircraft in their power supply. Accordingly, such video entertainment systems employed 60 Hz equipment and bulky frequency conversion apparatus for changing the 400 Hz power supply frequency to a 60 Hz operating frequency. This considerably added to the bulk and weight of the equipment and rendered such systems unacceptable in many airborne applications.

Further problems arose from the fact that existing video tape recording and playback equipment was awkward in its operation and required more attention from the flight personnel than their other duties permitted.

Another reason for the lack of success of such equipment arose from the fact that there was no reliable device for indicating to service personnel the state of wear of delicate parts, such as the video recording and playback heads. Accordingly, there were frequent breakdowns.

Another drawback arose from the entrenched belief that a high-quality video display system could only be realized with display apparatus comprising professional or institutional grade video monitors. The high price, bulk and weight of such equipment rendered its use out of the question in most practical applications.

A further drawback arose from the manifest inability of prior-art equipment to meet safety standards set by aviation authorities. Especially the heat generation problem proved cumbersome as existing cooling equipment was incapable of providing an acceptable solution.

SUMMARY OF THE INVENTION

The subject invention overcomes the above mentioned and other disadvantages of airborne video display equipment and provides a technologically and commercially acceptable airborne video display system of high quality, light weight and a minimum of maintenance. It will be recognized that various apparatus herein disclosed are not limited in their utility to airborne systems, but may be employed in other applications.

From one aspect thereof, the invention resides in an airborne video display system, and resides, more specifically, in the improvement comprising, in combination, apparatus for recording video signals onto a recording medium and for playing back recorded video signals from a recording medium, means in said apparatus for receiving broadcast television signals, means for displaying video signals, means connected to said receiving means, to said display means and to said apparatus for applying received video signals to said display means and to said recording apparatus, means for controlling said apparatus and said receiving means including a manually actuable record switch for initiating a recording operation and permitting application of said received video signals to said display means and to said recording apparatus, and means for selectively inhibiting said recording operation and said application of said received video signals upon manual actuation of said record switch, and means operatively associated with said inhibiting means for disabling said inhibiting means.

From another aspect thereof, the invention resides in apparatus for transducing information relative to an information carrier having a rest position, and for processing transmitted information. The invention according to this aspect resides, more specifically, in the improvement comprising, in combination, means including a transducing device for transducing information relative to said information carrier, means for totaling and indicating operating hours, means for positioning said information carrier in an active position at said transducing device, and means operatively associated with said totaling and indicating means and said positioning means for activating said totaling and indicating means only upon said positioning of the information carrier in said active position whereby only operating hours during which the information carrier is in said active position are totaled and indicated.

From another aspect thereof, the invention resides in apparatus for cooling rotary electromagnetic equipment having a rotating shaft, comprising, in combination, means surrounding said equipment and defining a space of varying cross-section having its smallest dimension adjacent a first end of said equipment and having its largest dimension and an opening adjacent an opposite second end of said equipment, and rotary means on said shaft adjacent said opening for drawing air through said equipment.

From yet another aspect thereof, the invention resides in apparatus for cooling rotary electromagnetic equipment and separate electrical components located in a housing, comprising, in combination, means for enclosing said electrical components including a shield surrounding said electromagnetic equipment, and means operatively associated with said electromagnetic equipment for drawing cooling air along said enclosing means and through said electromagnetic equipment.

From still another aspect thereof, the invention resides in apparatus for transducing information relative to an information carrier tape housed in a cassette and, more specifically resides in the improvement comprising, in combination, rotary transducing means for transducing information relative to said information carrier tape, an information carrier drum structure positioned at said rotary transducing means, means for positioning said information carrier tape in an active position at said transducing means, including means for extracting information carrier tape from said cassette and threading extracted information carrier tape onto said information carrier drum structure, selectively actuable means located outside said cassette for totaling and indicating operating hours, and means located in the path of said threading means for actuating said operating hour totaling and indicating means only upon a positioning of said information carrier tape in an active position at said transducing means.

BRIEF DESCRIPTION OF THE INVENTION

The subject invention and its various aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
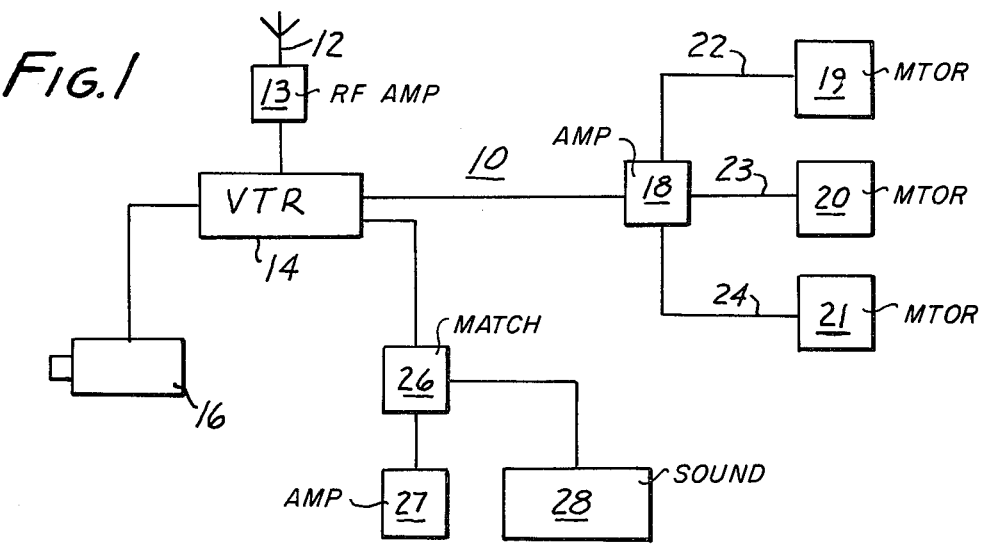
FIG. 1 is a block diagram of an airborne video display system in accordance with a preferred embodiment of the subject invention.

The airborne video display system 10 shown in FIG. 1 has an antenna 12 installed in the aircraft (not shown). A radio frequency amplifier 13 amplifies received video signals and applies them to a video tape recorder and playback machine 14. In accordance with a preferred embodiment, the machine 14 includes equipment 15 (see FIGS. 2 and 4) for receiving broadcast or transmitted television programs.

A video camera 16 may be connected to the video recording and playback machine (hereinafter referred to as "video recorder") 14 so that video information taken by aircraft personnel or passengers may be recorded and/or may be displayed on the video display equipment of the aircraft.

Video signals from the recorder 14 are applied to a video amplifier 18 for amplification for the purpose of application to several video display devices or monitors 19, 20 and 21 via lines 22, 23 and 24.

The audio portion of programs from the recorder 14 is applied to impedance matching equipment 26 to a preamplifier 27 and to a sound multiplex system 28 of the type found aboard aircraft for the distribution of sounds to passengers via headphones or similar transducing devices. Equipment (not shown) for testing the sound system may be combined with the impedance matching device 26.

Figure 2:
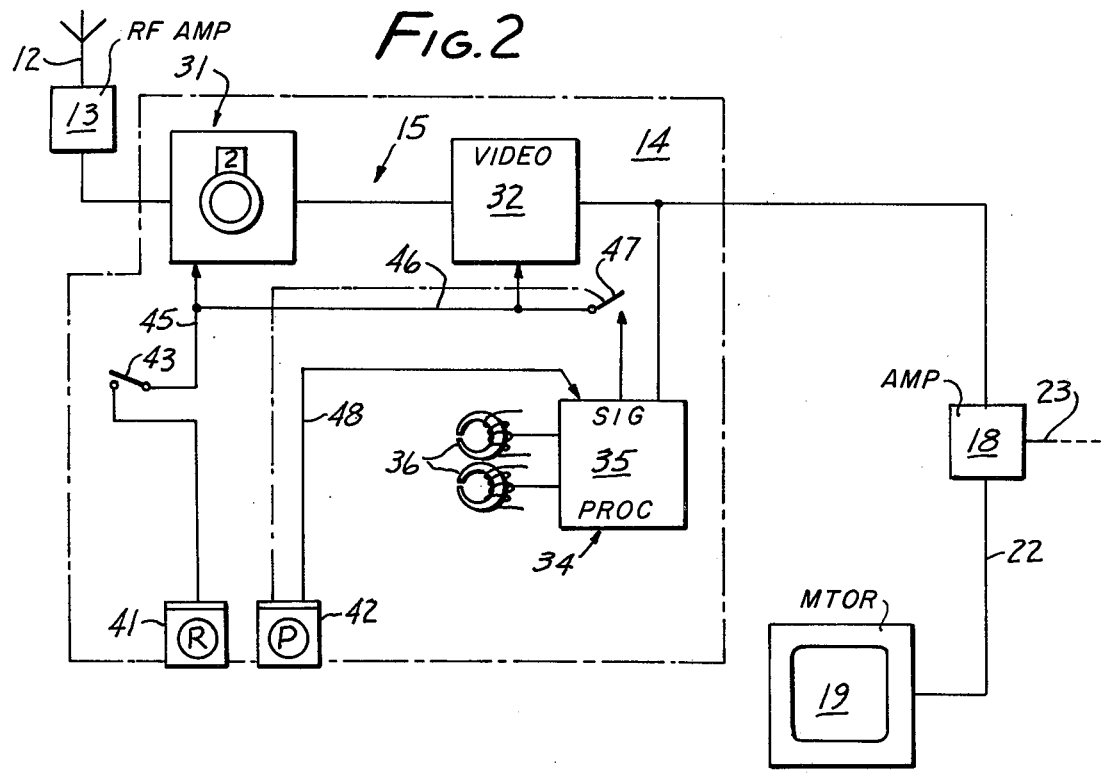
FIG. 2 is a block diagram similar to the diagram of FIG. 1 showing a modification in accordance with a further preferred embodiment of the invention.

Essential parts of a video tape recorder 14 suitable for use in the airborne video display system 10 are shown in FIG. 2.

According to FIG. 2, the antenna 12 and radio frequency amplifier 13 are connected to a video signal tuner 31 which permits a reception of broadcast television programs over any selected one of several video signal channels. The tuner 31 is combined with video amplifier, detector and signal processing equipment 32 for providing the video amplifier 18 with a video signal comprising image and synchronization information. As shown more fully in connection with FIG. 1, the amplified video signal is applied to display devices 19 to 21 via inverters 22 to 24 for a display of the received or reproduced video programs at several desired locations in the aircraft. As shown in FIG. 2, television programs received via the parts 12, 13, 31 and 32 may not only be applied to the display devices 19 to 21 for off the air viewing, but may also be applied to recording equipment 34 for recording on magnetic tape or another suitable information carrier. The recording equipment 34 includes head switching and signal processing circuits 35 and several video signal recording or transducing devices 36 connected thereto.

Customary controls for switching the video recorder 14 to "playback," "recording," "fast forward," and "rewind" may be provided.

Figure 3:
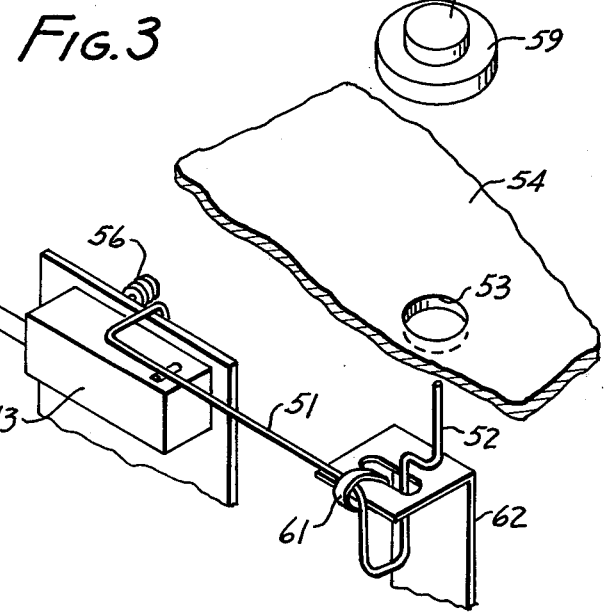
FIG. 3 is a perspective view of a device that may be employed in the system of FIG. 2, together with views of adjacent parts.

In FIG. 2, only the "recording" and "playback" controls are shown. These include a manually actuable record switch 41 and a manually actuable playback switch 42. If an electric switch 43, described more fully below in connection with FIG. 3, is closed, then the video tuner 31 and the video amplifier, detector and signal processing equipment 32 may be enabled by a depression of the record switch 41, as indicated in FIG. 2 by lines 45 and 46. The special recording equipment 35 can then also be enabled by depression of the record switch 41, but only if the play switch 42 is simultaneously depressed, thereby actuating a switch 47 which enables the record switch 41 to activate the recording equipment 35.

In accordance with conventional practice, the heads 36 and the equipment 35 may also be employed to reproduce recorded video programs for a display thereof by the display devices 19 to 21. In that case, depression of the play switch 42 activates the playback equipment via a line 48 shown in FIG. 2.

In the case of recording and playback equipment of the type so far disclosed, there is always a fear on the part of the manufacturer that the user of the equipment will inadvertently erase a valuable recording from the recording medium. Accordingly, most recording apparatus of this type have a device for selectively inhibiting the recording operation upon manual actuation of the record switch 41. In FIGS. 2 and 3, this inhibiting device has the form of a switch 43 which, when open, selectively inhibits the recording operation and the application of received video signals to the display devices 19 to 21.

This switch is normally open and, in prior-art equipment, is only closed upon the insertion of an information carrier which is properly conditioned for recording.

For example, and as shown in FIG. 3, the switch 43 may be equipped with a sensing device 51 which has a first state, illustrated in FIG. 3, when an inserted recording medium is conditioned for recording, and an alternative second state when the inserted recording medium is not conditioned for recording. The switch 43 would then be closed when the sensing means 51 is in its first state and open when the sensing means 51 is in its second state. More particularly, the sensing device 51 has a feeler or rod 52 which is capable of entering an aperture 53 in a cassette which houses the magnetic recording tape or other information carrier and part of which is shown at 54 in FIG. 3. The sensing device 51 is biased by a spring 56 which causes the feeler 52 to enter into the aperture 53 thereby opening the switch 43. In that case, the recording operation is inhibited as the recording medium is not considered conditioned for recording as long as the aperture 53 is open. Accordingly, no recorded video program can then be erased, even if the record switch 41 is actuated.

In order to condition the recording medium for recording, a plug 58 is inserted from below into the aperture 53 so that its head 59 projects from the cassette 54 and thereby prevents the feeler 52 from entering the opening 53 under the bias of the spring 56.

Rather, the head 59 of the inserted plug 58 will depress the feeler 52 so that the sensing device 51 will close the switch 43 whereby a recording operation can be initiated.

If a video recorder is provided with video signal receiving equipment of the type shown at 31 and 32 in FIG. 2, it is thus necessary to insert into the recorder a cassette 54 conditioned for recording by means of the plug 58 in order to close the switch 43 so that the receiving equipment 31 and 32 is enabled. With conventional equipment, it is thus necessary to insert a conditioned tape cartridge 54 into the recorder, even when only a display of off-the-air video programs without any recording operation is desired.

In the case of airborne video equipment, the latter necessity has proved to constitute a major inconvenience. In particular, the necessity of inserting a conditioned video cassette into the recorder even if no recording operation is desired has frequently confused the aircraft personnel. Also, such personnel is generally occupied with many other tasks and typically does not have time to search for a conditioned cassette. As an attempted remedy, it has been suggested that conditioned dummy cassettes which would not contain a recording tape, but which would actuate the sensing device 51, be provided aboard aircraft in order to enable off-the-air video display without a simultaneous recording operation. However, this proposal worked against the fact that space and weight is at a premium aboard aircraft. For every dummy cassette aboard aircraft, the space for a cassette with a recorded video program had to be sacrificed.

To solve this problem, the subject invention provides a very elegant solution which has proved highly advantageous despite some seeming drawbacks, which, in practice, have proved not to be extant.

In particular, the subject invention provides means operatively associated with the record inhibiting means for disabling these inhibiting means. In accordance with the preferred embodiment shown in FIG. 3, this is implemented by employing a tye 61 for maintaining the feeler 52 and sensor 51 in a depressed condition against the bias of the spring 56, whereby the switch 43 is permanently maintained in a closed condition. The tye 61 is fastened around a bracket 62 so that the feeler 62 can no longer move into any cassette aperture 53.

At first sight, it would appear that this aspect of the invention would lead to frequent inadvertent erasures of prerecorded programs. However, this has not been found to be the case. In this respect, it will be recalled from the above disclosure and it will be noted from FIG. 2 with reference to the switch 47, that both the record and playback switches 41 and 42 have to be actuated for a recording operation. With educated and trained personnel of the type employed aboard aircraft carriers, this has proved to be a sufficient safeguard for inhibiting inadvertent erasures, especially since the operator does not place any tape cassette into the recorder when only a display of off-the-air television programs is desired.

On the other hand, the operator naturally will actuate only the play switch 42 if a playback of a recorded video program, without any recording operation, is desired.

Figure 4:
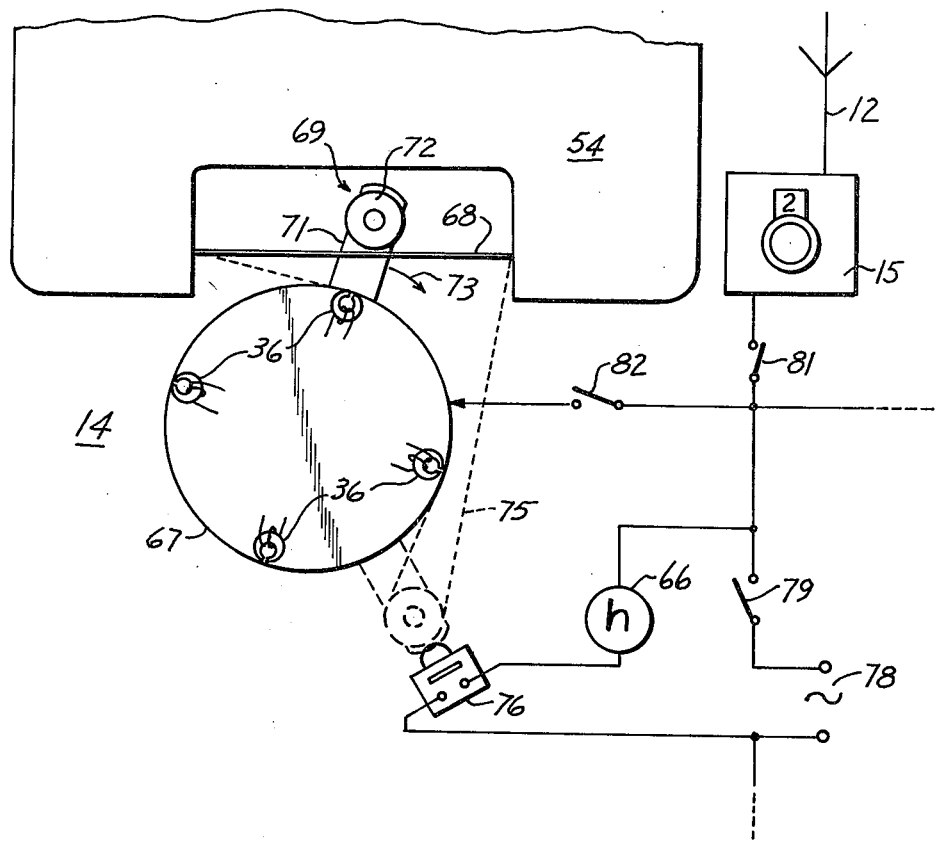
FIG. 4 is a diagrammatic view of recording, playback and receiving equipment in accordance with a further preferred embodiment of the invention.

The preferred embodiment of the aspect of the invention shown in FIG. 4 addresses itself to the problem that high-wear items, such as transducing devices, are often not properly serviced because of a lack of knowledge on the part of the service personnel as to the degree of wear of such items.

In particular, the preferred embodiment of FIG. 4 has a device 66 located outside the cassette 54 for totaling and indicating hours. By way of example, the device 66 may be in the nature of an electric clock, comprising a synchronous motor which drives time keeping equipment indicating lapsed hours.

The recording and playback heads or transducing devices in the embodiment of FIG. 4 are of a conventional rotating type, being associated with a tape drum or other information carrier drum structure positioned at the rotating transducer devices.

Preparatory to a recording or playback operation, the information carrier or tape 68 is "threaded" onto the drum structure 67. To this end, the video recorder 14 includes a tape extracting or threading device having at least one angularly movable arm 71 and an idler roller 72 mounted thereon. Upon angular movement in the direction of the arrow 73, the device 69 engages the information carrier 68 at its solidly illustrated rest position at the cassette 54 and positions the information carrier in an active position at the transducing devices 36, as indicated by a dotted line 75 in FIG. 4.

A normally open switch 76 is so positioned in the path of the tape threading device as to be closed by the angularly moving arm 71 when the tape 68 has been positioned in its threaded or active position 75.

Since the switch 76 is connected in series with the totaling device 66, such totaling device will only be energized from a power source 78 via the main switch 79 when the switch 76 has been closed upon positioning of the information carrier 68 in its threaded or active position 75.

On the other hand, the switch 76 will remain open and the totaling device 66 will remain inactive if only the equipment 15 for receiving off-the-air broadcasts is energized without any recording or playback operation taking place at the time.

In this respect, a switch 81 cooperates with the main switch 79 to energize the television receiving equipment 15. A switch 82, on the other hand, cooperates with the main switch 79 in order to activate the threading device 69 and recording head or transducer assembly of the recorder. If, in addition to the main switch 79, only the switch 81 is activated, no threading of the recording carrier 68 onto the drum structure 67 and thus no recording or playback operation will take place. In that case, the switch 76 will remain open as mentioned above and the device 66 will remain inactive.

On the other hand, if, in addition to the main switch 79, the switch 82 is closed either by itself for a recording or playback operation or in conjunction with the switch 81 for a simultaneous reception of television broadcasts, then the switch 76 will be closed by the angularly advancing arm 71 and the elasped time meter 66 will be energized to indicate how many hours the recording heads 36 have been operated.

In this manner the service personnel can gain a clear picture about the state of wear of the recording heads 36 and can take appropriate remedial action if the device 66 indicates a number of elapsed operating hours which would normally indicate sufficient head wear to justify replacement of the heads or other appropriate action.

The accurate indication of elasped operating hours of the sensitive equipment in question by the meter 66 will not be altered by an operation of the television receiving equipment 15 by itself, since the meter 66 is not activated unless the recording carrier 68 is actually in its active position 75 preparatory to and during a recording or playback operation.

Another problem that occurred with airborne video tape recorders was an overheating problem that could not practically be handled with conventional cooling equipment. In particular, it was found that the rotary electromagnetic equipment or motor 91 in airborne video tape recorders emitted a considerable amount of heat, especially if the same was of a 400 Hz type suitable for direct energization by the local power supply of the aircraft.

Figure 5:
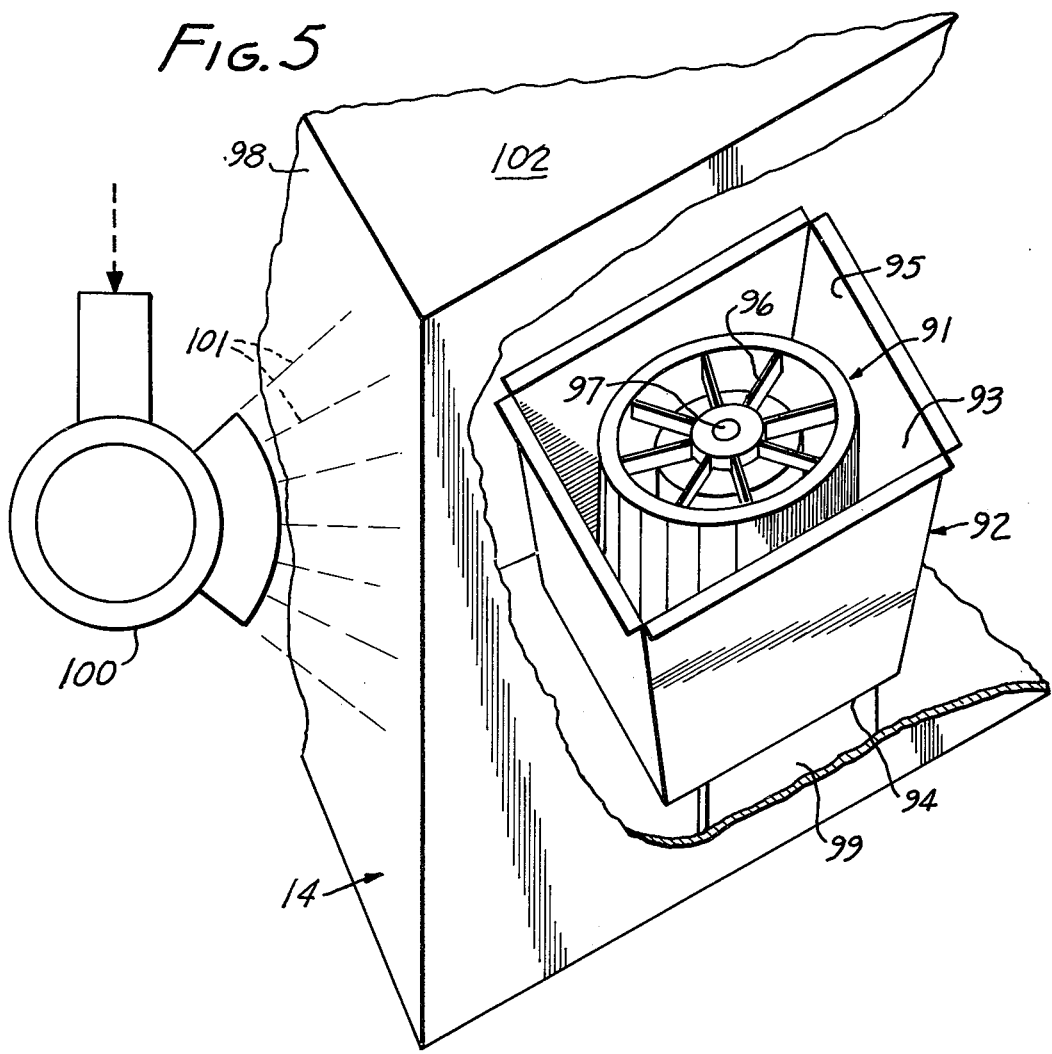
FIG. 5 is a perspective view of cooling equipment and related rotary apparatus in accordance with a further preferred embodiment of the subject invention.

In order to solve this problem and permit an efficient and effective operation of the equipment at the same time, the invention provides a heat shield, which may, for instance, be made of metal, and which surrounds the motor 98 as shown in FIG. 5. In particular, the shield 92 defines a space 93 around the motor 91 of varying cross-section. The smallest dimension of the space 93 is located at 94 adjacent a first or lower end of the motor 91, and has its largest dimension and an opening 95 adjacent the opposite or second end of the motor 91.

Rotary means in the form of a fan 96 are located on the shaft 97 of the motor 91 adjacent the opening 95 for drawing air through the motor 91.

It will further be noted that the electrical equipment 91 has a cylindrical housing in the illustrated preferred embodiment, and that the shield 92 surrounds such cylindrical housing as shown in FIG. 5. The shield is tapered in a direction from the second or upper motor end to the first or lower end thereof.

In the illustrated preferred embodiment, the shield 92 has a rectangular cross-section.

In practice, the interesting and beneficial effect has been observed that the tapered shield 92 causes cooling air to be efficiently conducted past the motor 91 for an effective cooling thereof.

To further such cooling effect and to guard conduits and circuits from the heat of the motor, the preferably metallic housing 98 of the recorder 14 may be cooled from the outside thereof, with the shield 92 being mounted inside the housing 98 with the aid of a mounting bracket 99.

External cooling of the recorder housing 98 may be effected by a cooling device located outside the housing and applying a coolant 101 to a side of the housing in the vicinity of the internal heat shield 92. The cooling device 100 may include or be connected to an air blower which applies coolant 101 in the form of a blast of cool air to the recorder housing 98. In accordance with a preferred embodiment of the invention, the internal heat shield 92 is closed at its bottom 94 whereby air will only enter or leave the heat shield structure at the opening 95. If desired, the coolant 101 may be applied to the side 102 of the recorder 14 in the vicinity of the heat shield opening 95.

Figure 6:
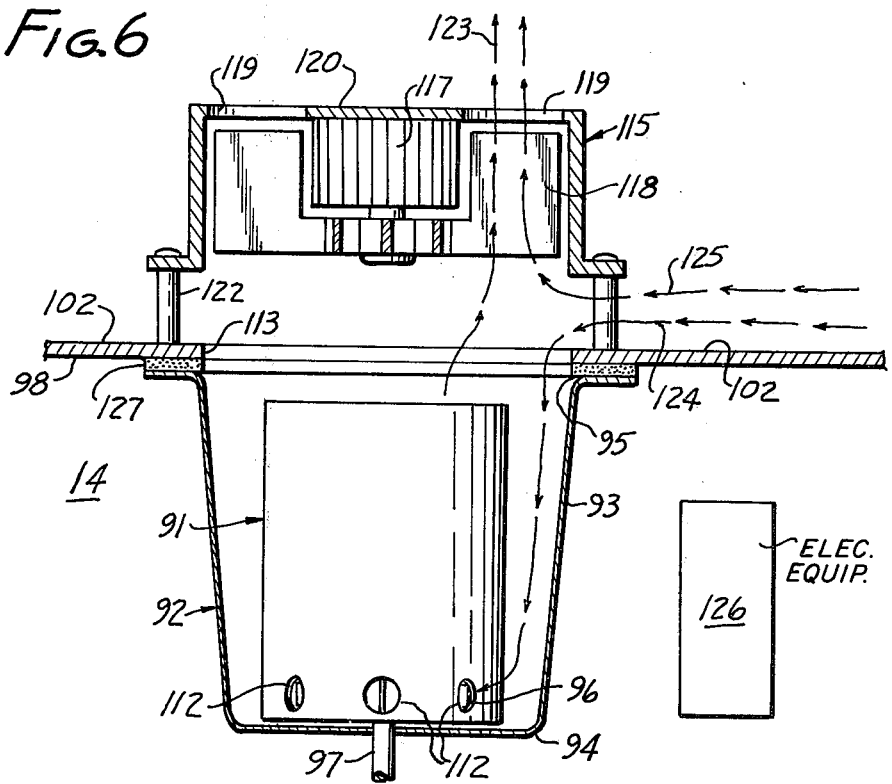
FIG. 6 is a section of modifications of the embodiment of FIG. 5.

In accordance with the preferred embodiment shown in FIG. 6, the fan 96 on the shaft 97 is located near 94 adjacent the end of the motor 91 which is remote from the opening 95. Apertures 112 in the cylindrical motor housing permit the flow of air to or from the fan 96.

The modification according to FIG. 6 so far described may be implemented into the embodiment of FIG. 5, in which case the upper fan 96 on the motor shaft 97 near the opening 95 may be omitted.

In accordance with a further preferred embodiment shown in FIG. 6, the recorder housing 98 may have an aperture 113 in the side 102 and at the opening 95 of the shield 92. A fan 115 is located on the recorder housing 98 at the aperture 113 for applying a coolant in the form of a stream of air to the motor 91 and, if desired, to other equipment in the housing 98. To this end, the fan 115 has its own electric motor 117 which drives a fan blade structure 118 for drawing or pushing air through apertures 119 in a fan housing 119.

In accordance with a further preferred embodiment of the subject invention, the fan 115 is mounted in spaced relationship to the aperture 113 and the housing 98 at its side 102 with the aid of posts 122. In this manner, cooling air may not only be drawn relative to the motor 91 as indicated by the arrow 123, but also along the housing side 102 as indicated by the arrows 124 and 125. Accordingly, the housing 98 is cooled along the side 102 whereby electric components 126 inside the housing 98 are also cooled. A gasket 127 may be provided between the housing 98 and the shield 92 to thermally isolate the motor 91 from the other electric omponents in the housing 98. In particular, an exchange of smoke or the like between the inside of the housing 98 containing components other than the motor 91 and the passenger compartment of the aircraft in the case of internal fires in the recorder 14 is avoided whereby compliance with safety regulations is provided for in an effective manner.

In reviewing FIG. 6 it will be noted that the motor shield 92 in that preferred embodiment cooperates with the housing 98 to enclose the separate electrical components 126. The fan 115 then cooperates with the fan 96 in drawing cooling air along the enclosure or housing 98 and through the motor 91.

In particular, the fan 115 draws cooling air along the outside of the enclosure or housing 98. The outside in this case is the side which faces away from the electrical components 126, in contradistinction to the inside which faces these electrical components.

Similarly, the fans 96 and 115 cooperate in drawing cooling air both along the named outside of the enclosure or housing and the inside of the shield 92. The inside of the shield in this case is the side which faces the motor 91, while the outside of the shield 92 is the side which faces away or radially outwardly from the motor and at least in part toward the separate electrical components 126.

It will thus be recognized that the passenger area of the aircraft is effectively isolated from those components 126 inside the housing 98 which present the greatest fire hazard. This not only prevents smoke from these components from reaching the passengers, but also effectively smothers any fire that may start inside the apparatus 14. The requisite effective cooling of the motor 91 is maintained, on the other hand, as may be realized from a consideration of FIG. 6.

Modifications and variations within the spirit and scope of the subject invention will become apparent from or suggest themselves by the subject extensive disclosure to those skilled in the art.

We claim:

1. In apparatus for transducing information relative to an information carrier having a rest position, and for processing transmitted information, the improvement comprising in combination:
   means including a transducing device for transducing information relative to said information carrier;
   means for totaling and indicating operating hours of said transducing device;
   means for positioning said information carrier in an active position at said transducing device; and
   means operatively associated with said totaling and indicating means and said positioning means for activating said totaling and indicating means only upon said positioning of the information carrier in said active position whereby only operating hours during which the information carrier is in said active position are totaled and indicated.

2. An apparatus as claimed in claim 1, wherein:
   said information transducing means include rotating transducer devices and an information carrier drum structure at said rotating transducer devices;
   said positioning means include means for threading said information carrier onto said drum structure; and
   said activating means including means for sensing said threading of said information carrier onto said drum structure and for activating said totaling and indicating means only upon a said threading of the information carrier.

3. An apparatus as claimed in claim 2, wherein:
   said information processing means include means for receiving transmitted information; and
   said apparatus includes means for operating said transmitted information receiving means independently of said information transducing means.

4. In apparatus for transducing information relative to an information carrier tape housed in a cassette, the improvement comprising in combination:
   rotary transducing means for transducing information relative to said information carrier tape;
   an information carrier drum structure positioned at said rotary transducing means;
   means for positioning said information carrier tape in an active position at said transducing means, including means for extracting information carrier tape from said cassette and threading extracted information carrier tape onto said information carrier drum structure;
   selectively actuable means located outside said cassette for totaling and indicating operating hours of said rotary transducing means; and
   means located in the path of said threading means for actuating said operating hour totaling and indicating means only upon a positioning of said information carrier tape in an active position at said transducing means.

5. An apparatus as claimed in claim 4, wherein:
   said totaling and indicating means include electrically driven time keeping means; and
   said actuating means include electrical switch means connected to said time keeping means and located in the path of said threading means for electrically energizing said operating hour totaling and indicating means only upon a positioning of said information carrier tape in an active position at said transcribing means.

6. An apparatus as claimed in claim 4, including:
   means for receiving transmitted information; and
   means connected to said transmitted information receiving means for operating said transmitted information receiving means independently of said transducing means.

* * * * *